(12) United States Patent
van den Berg

(10) Patent No.: US 10,427,857 B2
(45) Date of Patent: Oct. 1, 2019

(54) MULTI-COMPARTMENT BAG

(71) Applicant: Otium Packaging Technology BV, Zuid-Scharwoude (NL)

(72) Inventor: Hendrik Jan van den Berg, Hoofddorp (NL)

(73) Assignee: Otium Packaging Technology BV, Amsterdam (NL)

( * ) Notice: Subject to any disclaimer, the term of this patent is extended or adjusted under 35 U.S.C. 154(b) by 54 days.

(21) Appl. No.: 15/304,554

(22) PCT Filed: Apr. 17, 2015

(86) PCT No.: PCT/NL2015/050259
§ 371 (c)(1),
(2) Date: Oct. 17, 2016

(87) PCT Pub. No.: WO2015/160258
PCT Pub. Date: Oct. 22, 2015

(65) Prior Publication Data
US 2017/0043934 A1 Feb. 16, 2017

(30) Foreign Application Priority Data
Apr. 17, 2014 (NL) .................................. 2012647

(51) Int. Cl.
B65D 81/32 (2006.01)
B65B 51/30 (2006.01)
(Continued)

(52) U.S. Cl.
CPC ............ B65D 81/3261 (2013.01); A23L 5/10 (2016.08); B65B 9/20 (2013.01); B65B 9/2056 (2013.01);
(Continued)

(58) Field of Classification Search
CPC ... A23L 5/10; A23V 2002/00; B65B 2220/08; B65B 2220/10; B65B 2220/20;
(Continued)

(56) References Cited

U.S. PATENT DOCUMENTS 2,831,302 A * 4/1958 Jensen ................. A22C 11/104
53/138.4
3,795,081 A * 3/1974 Brown, Jr. .............. B65B 29/10
493/196

(Continued)

OTHER PUBLICATIONS

Merriam-Webster dictionary entry of term "Edge", retrieved on Sep. 14, 2018 from URL www.merriam-webster.com/dictionary/edge.*
(Continued)

*Primary Examiner* — Hemant Desai
*Assistant Examiner* — Valentin Neacsu
(74) *Attorney, Agent, or Firm* — N.V. Nederlandsch Octrooibureau; Catherine A. Shultz; Katelyn J. Bernier

(57) ABSTRACT

A method is disclosed for forming a two-compartment bag. The method comprises draping a sheet of bag forming material around a primary fill pipe and one or more secondary fill pipes, forming multiple compartments by sealing the sheet material around the respective fill pipes, filling the various compartments with material, and sealing the bag. The method comprises forming transverse seals so that a transverse seal area of a secondary compartment at least partially overlaps with a transverse seal area of the first compartment, so that the secondary compartment is fixedly folded against the first compartment.
The method permits the volume of the secondary compartments to be varied independent from the volume of the primary compartment. Each compartment may be opened without opening the other compartments.
(Continued)

In a preferred embodiment the bag is made of a microwave-compatible material, and at least one of the compartments contains a food material intended for reheating or preparation in a microwave oven.

10 Claims, 5 Drawing Sheets

(51) Int. Cl.
  *B65D 75/46* (2006.01)
  *B65B 9/20* (2012.01)
  *B65B 9/22* (2006.01)
  *A23L 5/10* (2016.01)
  *B65D 77/08* (2006.01)
  *B65D 81/34* (2006.01)

(52) U.S. Cl.
  CPC ............... *B65B 9/22* (2013.01); *B65B 51/30* (2013.01); *B65D 75/46* (2013.01); *B65D 77/08* (2013.01); *B65D 81/3461* (2013.01); *A23V 2002/00* (2013.01); *B65B 2220/08* (2013.01); *B65B 2220/10* (2013.01); *B65B 2220/20* (2013.01); *B65B 2220/22* (2013.01)

(58) Field of Classification Search
  CPC ... B65B 2220/22; B65B 2220/16; B65B 9/20; B65B 9/2056; B65B 9/22; B65B 9/2035
  See application file for complete search history.

(56) References Cited

U.S. PATENT DOCUMENTS

| | | | | |
|---|---|---|---|---|
| 3,861,522 | A * | 1/1975 | Llewellyn | C04B 40/065 206/219 |
| 3,915,297 | A * | 10/1975 | Rausch | B65B 29/10 206/219 |
| 4,009,778 | A * | 3/1977 | Howell | B65B 29/10 206/219 |
| 4,103,473 | A * | 8/1978 | Bast | B65D 81/3261 156/497 |
| 5,758,473 | A * | 6/1998 | Patelli | B65B 9/20 222/541.6 |
| 6,622,459 | B1 * | 9/2003 | Sarria Sanchez | B65B 9/2028 53/450 |
| 6,641,306 | B1 * | 11/2003 | Knoerzer | B65D 31/12 383/38 |
| 8,202,024 | B2 * | 6/2012 | Simmons | B65B 9/2028 405/259.6 |
| 9,694,960 | B2 * | 7/2017 | Conners | B65D 75/44 |
| 2003/0009989 | A1 * | 1/2003 | Knoerzer | B65B 9/20 53/451 |
| 2003/0223653 | A1 * | 12/2003 | Knoerzer | B65D 31/12 383/40 |
| 2004/0226849 | A1 * | 11/2004 | Brenkus | B65B 9/20 206/484 |
| 2005/0238766 | A1 * | 10/2005 | Henderson | B26F 1/14 426/106 |
| 2006/0009989 | A1 | 1/2006 | McCormick | |
| 2006/0156696 | A1 * | 7/2006 | Bezek | B65B 9/2042 53/450 |
| 2007/0127853 | A1 * | 6/2007 | Bezek | B65B 9/20 383/38 |
| 2009/0162496 | A1 * | 6/2009 | Henderson | B26F 1/14 426/87 |
| 2012/0125947 | A1 * | 5/2012 | Becker | B65D 75/56 222/105 |
| 2013/0202226 | A1 * | 8/2013 | Hartzfield | B65D 75/30 383/39 |

OTHER PUBLICATIONS

NL 2012647 Search Report, dated Apr. 17, 2014.
IPRP for PCT/NL2015/050259, dated Aug. 18, 2016.

* cited by examiner

MULTI-COMPARTMENT BAG

BACKGROUND OF THE INVENTION

1. Field of the Invention

The invention relates generally to a method for forming a multi-compartment bag, in particular a two-compartment bag, and more specifically a method for forming a two-compartment bag on a vertical form-fill-seal (VFFS) machine.

2. Description of the Related Art

Prior art processes for forming multi-compartment bags tend to be complex and generally offer limited flexibility for modifying the volume of the second compartment relative to the volume of the first compartment.

DE 10 2007 025 786 A1 discloses a method for forming tubular bags. Two consecutive bags are left attached to each other. The two bags necessarily have the same diameter. The volume of the second bag can be varied by varying the location of a transverse seal.

DE 20 2004 002 244 U1 discloses a "chain bag" comprising at least two compartments that are separated from each other by a heat seal. The construction does not permit the two compartments to be filled simultaneously. The two compartments have identical cross sections.

EP 2 567 898 A1 discloses a detergent package made of a water soluble material. The package has an inner compartment fully encircled by an outer compartment.

U.S. Pat. No. 5,758,473 discloses a method for manufacturing packages for liquid food products in which a flexible sheet material member is folded into a tubular shape so that longitudinal strips extend outwardly. Suitable welding lines are made so as to form a channel compartment that is closed at one end and in communication with an inside of the package.

US 2012/0125947 discloses a flexible bag comprising a dispensing portion, a panel forming a first compartment, a second compartment extending from the first compartment, and an elongated grip disposed at least in part in the second compartment.

US 2003/0009989 discloses multiple side-by-side packages produced on a vertical form, fill, and seal machine by using a former/delivery tube assembly designed for this purpose.

U.S. Pat. No. 6,622,459 B1 discloses a process for continuously manufacturing and filling multiple cavity bags. According to the method a sheet of plastic material is fed along a forming column; and the plastic material is sealed along a first longitudinal seal to form a sleeve. The sleeve is fed along two cores and sealed in central and bottom parts.

Thus, there is a need for a multi-compartment bag in which all compartments can be filled simultaneously. There is a further need for such bag in which the volume of the one compartment can be varied independent from the volume of the other compartment or compartments. There is a further need for such bag having a first compartment folded against a second compartment during transportation and shelf display. There is a further need of such bag suitable for heating a food material contained therein in a microwave oven.

BRIEF SUMMARY OF THE INVENTION

The present invention addresses these problems by providing a method for forming a multi-compartment bag comprising the steps of:

a. draping a portion of a continuous sheet 11 of bag forming material around a primary fill pipe so that two plies of the sheet meet inward of a first and a second longitudinal edge along a first seal line, leaving flaps extending beyond the first seal line to the first and second longitudinal edges of the sheet;

b. draping the flaps around at least one secondary fill pipe so that the first and second longitudinal edges of the sheet meet at a second seal line;

c. forming longitudinal seals along the first and second seal lines;

d. forming a transverse seal comprising transverse seal areas below the primary and secondary fill pipes to form a bag having a first compartment encircling the first fill pipe and at least one secondary compartment encircling the secondary fill pipe or fill pipes, so that a transverse seal area of the at least one secondary compartment at least partially overlaps with a transverse seal area of the first compartment;

e. metering a primary material into the first compartment and one or more secondary materials into the secondary compartment or compartments.

Another aspect of the invention comprises a machine for carrying out the method.

Yet another aspect of the invention comprises a bag made by the method of the invention.

DETAILED DESCRIPTION OF THE INVENTION

Figure 1:
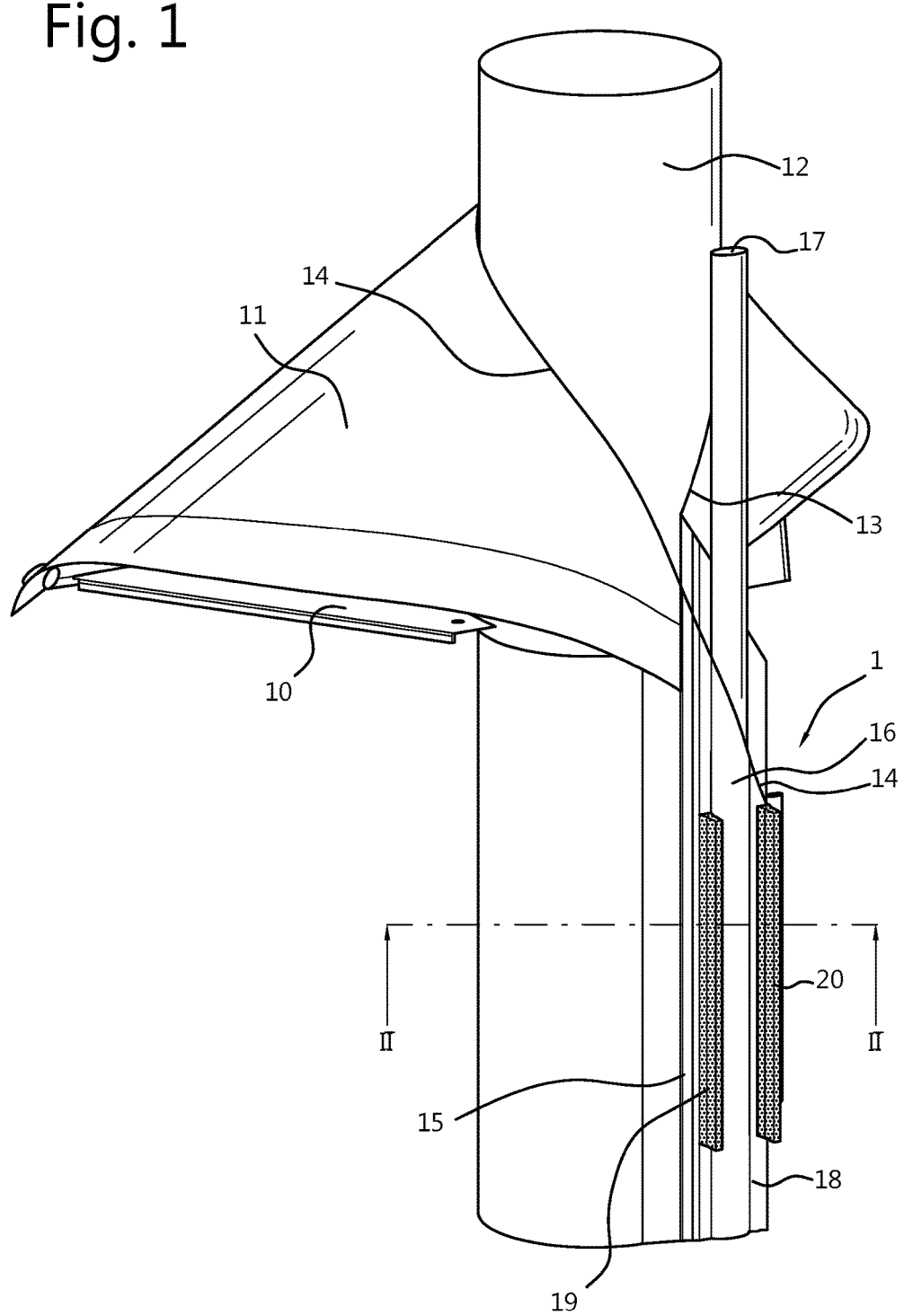
FIG. 1 is a perspective view of a portion of a machine for forming a two-compartment bag according to the invention.

The following is a detailed description of the invention.

In its broadest aspect the present invention relates to a method for forming a multi-compartment bag comprising the steps of:

a. draping a portion of a continuous sheet 11 of bag forming material around a primary fill pipe so that two plies of the sheet meet inward of a first and a second longitudinal edge along a first seal line, leaving flaps extending beyond the first seal line to the first and second longitudinal edges of the sheet;

b. draping the flaps around at least one secondary fill pipe so that the first and second longitudinal edges of the sheet meet at a second seal line;

c. forming longitudinal seals along the first and second seal lines;

d. forming a transverse seal comprising transverse seal areas below the primary and secondary fill pipes to form a bag having a first compartment encircling the first fill pipe and at least one secondary compartment encircling the secondary fill pipe or fill pipes, so that a transverse seal area of the at least one secondary compartment at least partially overlaps with a transverse seal area of the first compartment;

e. metering a primary material into the first compartment and one or more secondary materials into the secondary compartment or compartments.

The invention will now be described in more detail for a two-compartment bag.

A continuous sheet of bag forming material is draped over a forming shoulder and around a primary fill pipe of a suitable package forming machine, for example a vertical form-fill-seal (VFFS) machine, in a manner similar to a standard VFFS process. The present method differs from the standard process in that the width of the continuous sheet is chosen so that flaps of the material extend beyond a first seal line. The flaps are draped around a secondary fill pipe so that the longitudinal edges of the sheet meet at a second seal line.

Longitudinal seals are then formed along the first and second seal lines. The seals are formed in known fashion, for example by means of seal bars. The longitudinal seals form a two-compartment tube having a primary compartment and a secondary compartment.

A transverse seal is formed below the primary and secondary fill pipes, so that a bag is formed having a first compartment encircling the primary fill pipe and a second compartment encircling the secondary fill pipe. The transverse seal closes the bottoms of the first and second compartments. In general one transverse seal is formed to close the bottoms of both compartments. The transverse seal is formed so that the transverse seal of the secondary compartment at least partially overlaps with the transverse seal of the primart compartment.

A primary material is metered into the first compartment, and a secondary material is metered into the secondary compartment.

Once a bag has been formed, the bag, together with the sheet of bag forming material, can be moved down by the length of the bag. The top of the bag can now be sealed, below the two fill pipes. This seal at the same time forms the bottom seal of the next bag to be formed, in a manner customary for bag forming on a vertical form-fill-seal (VFFS) machine. After the seal is formed the filled bag is cut off from the sheet of bag forming material. The steps d. and e. can now be repeated.

The volume of the second compartment is determined by the width of the flap or flaps, which is selected in function of the cross section of the secondary fill pipe. In general, the volume of the second compartment is chosen to be smaller than the volume of the first compartment.

In the method, steps c. and d. may be carried out simultaneously or sequentially. In general it is preferred to carry out these steps simultaneously.

In step d., in the area of a secondary compartment the transverse seal comprises four plies of bag forming material, that is, two plies forming the first compartment and two plies forming the secondary compartment. In this part of the transverse seal the four plies are sealed together, so that the transverse seal of the secondary compartment overlaps with the transverse seal of the first compartment. Preferably this is repeated when the top seal of the bag (which abuts the bottom seal of the bag being formed next) is formed.

As a result of the overlapping transverse seal or seals the secondary compartment is folded against the first compartment, and is fixed in this position. This fixed folded configuration prevents the secondary compartment from extending from the first compartment during handling, storage, transportation or display. The fixed folded configuration offers a number of advantages. It reduces the risk of damage during transportation and handling; it fixes the appearance of the bag, so that surfaces intended to be visible will be visible, and surfaces intended to be hidden will be hidden; and it limits the display dimensions of the bag to substantially the display dimensions of the first compartment, so that the use of shelf space in for example supermarkets remains within desired limits.

It will be understood that the multi-compartment bag can be sized and configured so that the entire transverse seal area of at least one of the secondary compartments fully overlaps with an area of the transverse seal of the primary compartment.

The method can be adopted to forming a bag comprising a primary compartment and more than one, for example up to four, secondary compartments.

The method is conveniently carried out on a vertical form-fill-seal (VFFS) machine. Standard VFFS machines have one fill pipe and, in most cases, one sealing block for providing the longitudinal seal. For carrying out the method of the invention a VFFS machine can be equipped with a secondary fill pipe and a second longitudinal sealing block.

As the volume of the second compartment is generally smaller than that of the first compartment, the cross section of the secondary fill pipe is generally smaller than the cross section of the primary fill pipe. For example, the secondary fill pipe has a cross section in the range of from 10% to 75% of the cross section of the primary fill pipe.

Another aspect of the invention is a bag formed by the method of the invention. The bag forming material suitably is a polymer material, for example a film of polyethylene (PE), polypropylene (PP), polystyrene (PS), polyethylene terephtalate (PET), or a combination (for example a laminate) of such materials. The bag forming material may be provided with a barrier material to improve the shelf stability of the contents of the bag.

The secondary compartment or compartments is/are closed off from the first compartment. If there is more than one secondary compartment, the individual secondary compartments are preferably closed off from each other.

In a preferred embodiment the primary compartment of the bag contains a food material, and the secondary compartment or compartments contain a accompaniments to the food material. For example, the food material may be a carbohydrate-rich food material, such as rice, pasta, potatoes, or the like, and the accompaniments may be a seasoning, an herb, a spice, a sauce, or a combination thereof.

In an embodiment the bag forming material is suitable for containing the food material while the food material is being heated or prepared in a microwave oven. This means, in general terms, that the bag forming material must be approved for being in contact with food at elevated temperatures, and that the bag forming material must be substantially transparent to electromagnetic energy at wavelengths used in microwave ovens.

In another embodiment the bag forming material is suitable for refrigeration or freezing. For example, the primary compartment may contain lettuce, and the secondary compartments may contain salad dressing, croutons, and the like.

An important feature of the bag according to the invention is that the compartments can be opened independent from each other. For example, the primary compartment may contain potatoes, and two secondary compartments may contain parsley and salt packets, respectively. The secondary compartments can be opened, and the parsley and salt removed therefrom, without opening the primary compartment. The potatoes in the bag can now be heated or cooked in a microwave oven. When the potatoes are done, the primary compartment can be opened, the potatoes moved to a dish or plate, and seasoned with the salt and the parsley from the secondary compartments.

In an embodiment one or both compartments are provided with an easy-opening feature, such as a zip lock or seal flap, in a manner known in the art.

DESCRIPTION OF ILLUSTRATIVE EMBODIMENTS/EXAMPLES

The following is a description of certain embodiments of the invention, given by way of example only.

FIG. 1 shows a portion of a VFFS machine 1, modified to carry out the method of the invention. A sheet 11 of bag forming material is draped over forming shoulder 10 and around primary fill pipe 12. Sheet 11 has a first longitudinal edge 13 and a second longitudinal edge 14.

First longitudinal edge 13 meets sheet 11 along first seal line 15, forming a tubular primary compartment around primary fill pipe 12. Flap 16 extends out from first seal line 15 to longitudinal edge 14. Flap 16 is draped around secondary fill pipe 17. Longitudinal edge 14 meets sheet 11 along second seal line 18.

To form the bag, a sealing block located below fill pipes 12 and 17 (not shown) forms a transverse seal, and sealing blocks 19 and 20 form two longitudinal seals. Sealing block 19 seals a primary compartment, and sealing block 20 seals a secondary compartment. A primary material is metered in known fashion into the primary compartment via primary fill pipe 12. A secondary material is metered in similar fashion into the secondary compartment via secondary fill pipe 17.

Figure 2:
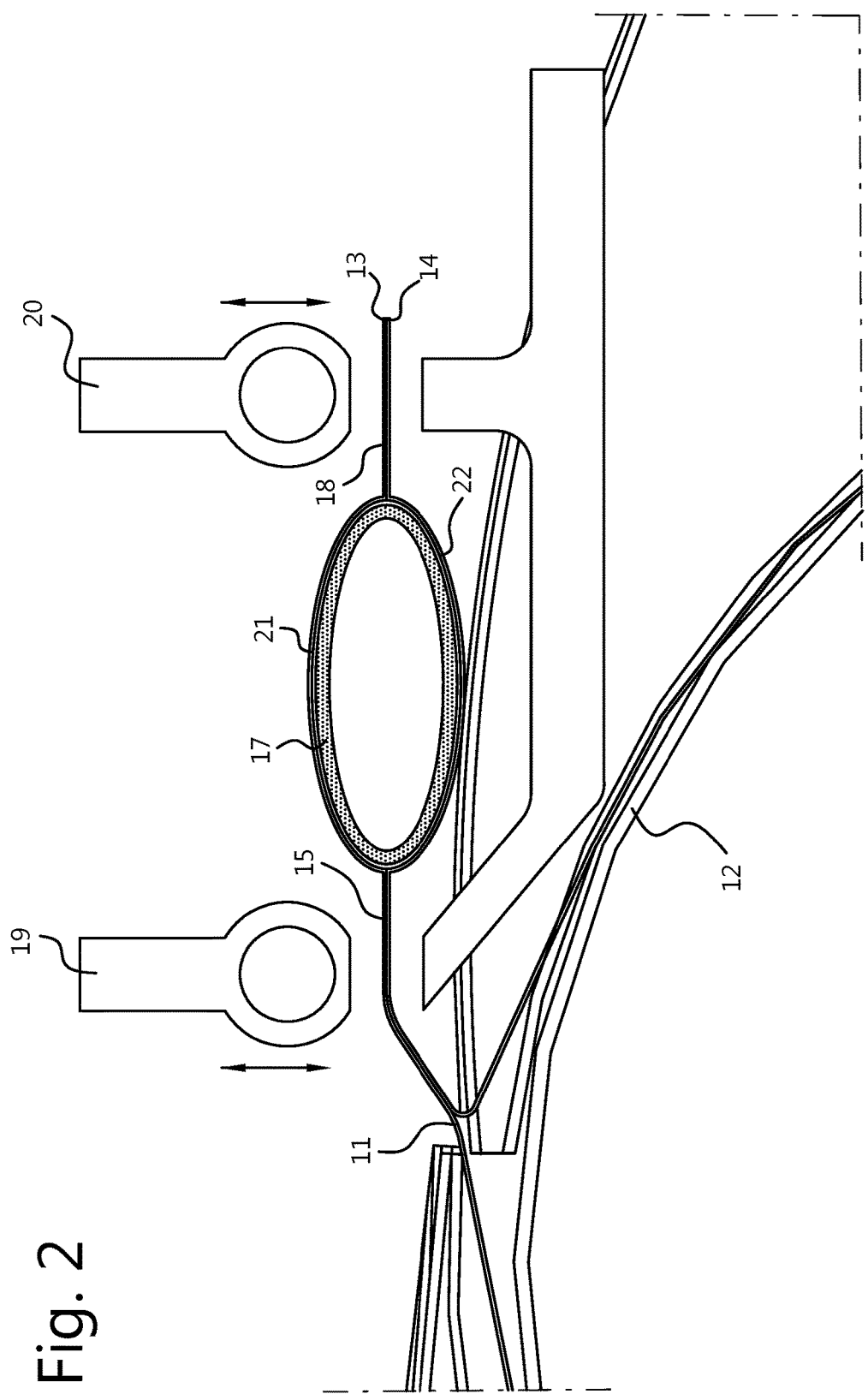
FIG. 2 is a cross sectional view along the line II-II of FIG. 1 showing an alternative method of draping a sheet of bag forming material.

FIG. 2 shows a cross section of the VFFS machine of FIG. 1, taken along line II-II. The sheet 11 is draped around second fill pipe 17 in an alternate fashion, so that longitudinal side edges 13 and 14 meet near second seal line 18. A first end 21 bordering edge 13 of sheet 11 is draped over the surface of fill pipe 17 that is distal to fill pipe 12; a second end 22 bordering edge 14 is draped over the surface of fill pipe 17 that is proximal to fill pipe 12.

Figure 4:
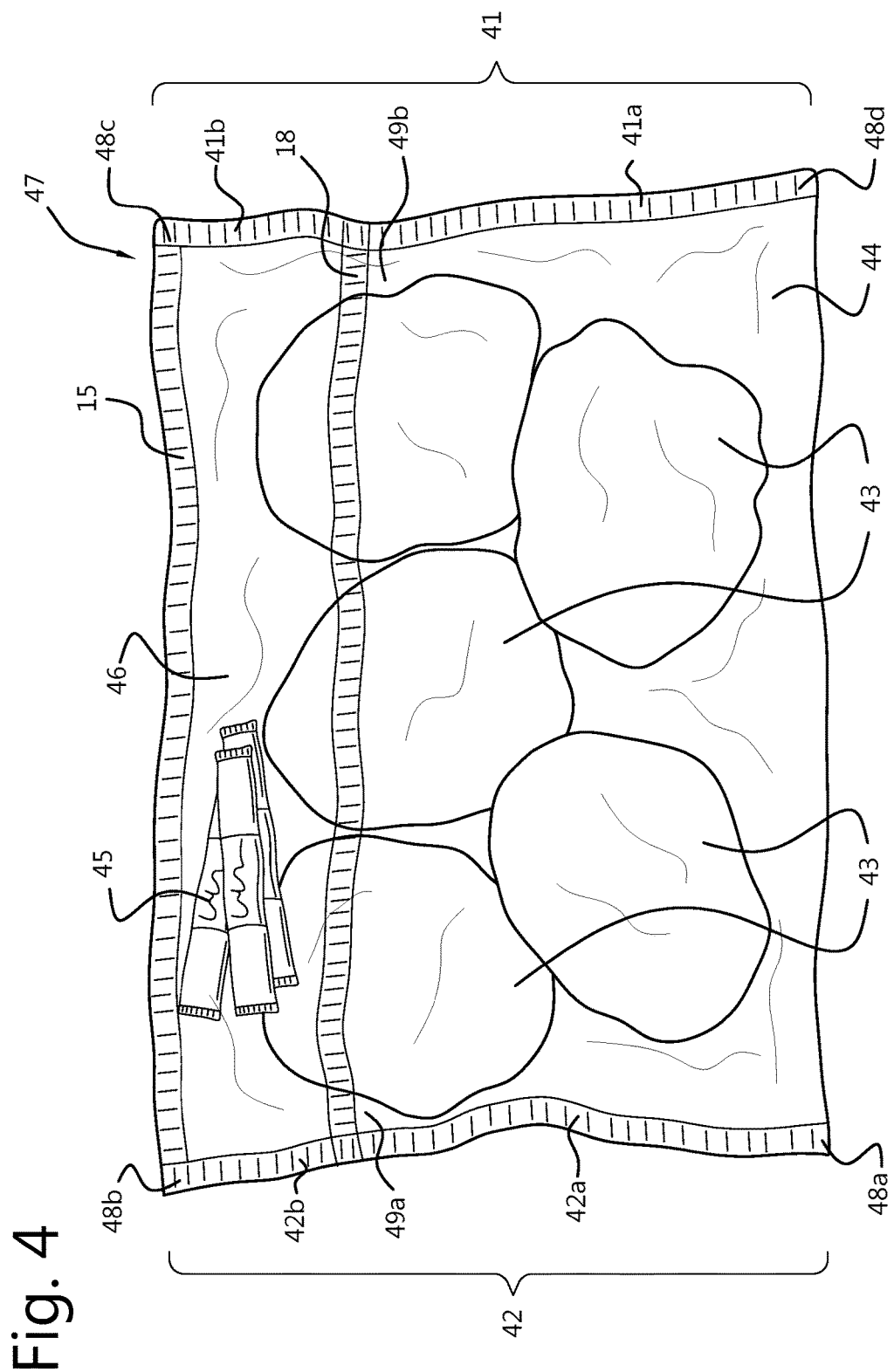
FIG. 4 shows a finished bag according to the embodiment of FIG. 2.

The secondary compartment formed in the embodiment of FIG. 2 is connected to the first compartment along seal line 15. The secondary compartment can be folded onto the first compartment, and attached to it near seal line 18 by a glue bead. The resulting bag is shown in FIG. 4.

Figure 3:
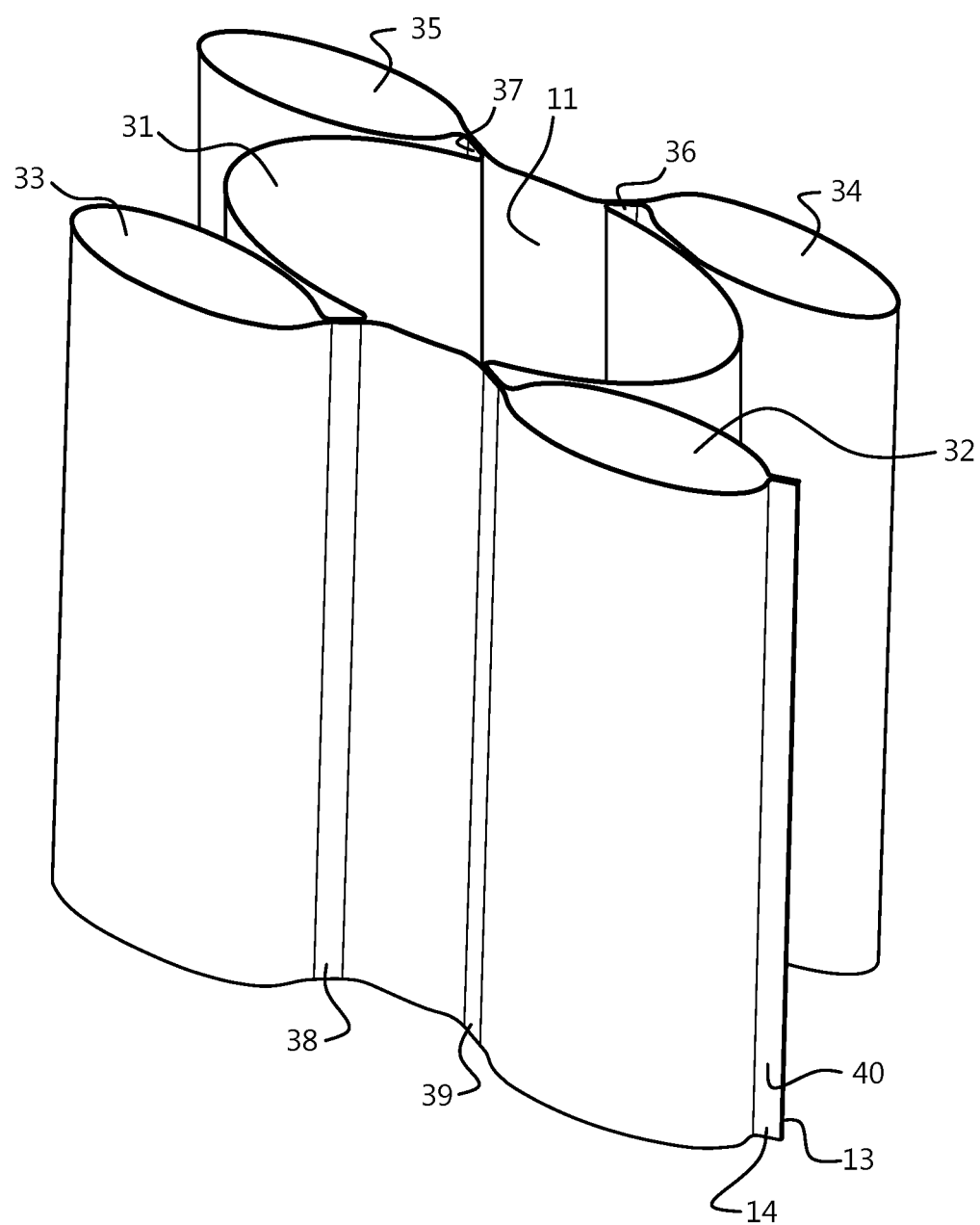
FIG. 3 is a schematic cross-sectional view of a five-compartment bag according to the invention being formed.

FIG. 3 is a schematic cross-sectional view of a five-compartment bag 30, which has a primary compartment 31 and four secondary compartments 31, 32, 33, 34, and 35. Sheet 11 is draped around five fill pipes (not shown), a primary fill pipe forming compartment 31, and four secondary fill pipes forming compartments 32, 33, 34, and 35. The longitudinal edges 13 and 14 meet just outside compartment 32.

Bag 30 can conveniently be made on a VFFS that is set up for making bags having four longitudinal seals, such as the Quattro Seal bag. Such a machine is modified to make the bag of FIG. 3 by placing four secondary fill pipes at the four corners, and by providing a fifth longitudinal seal block to form seal 40. The standard four seal blocks form seals 36, 37, 38, and 39.

Figure 3A:
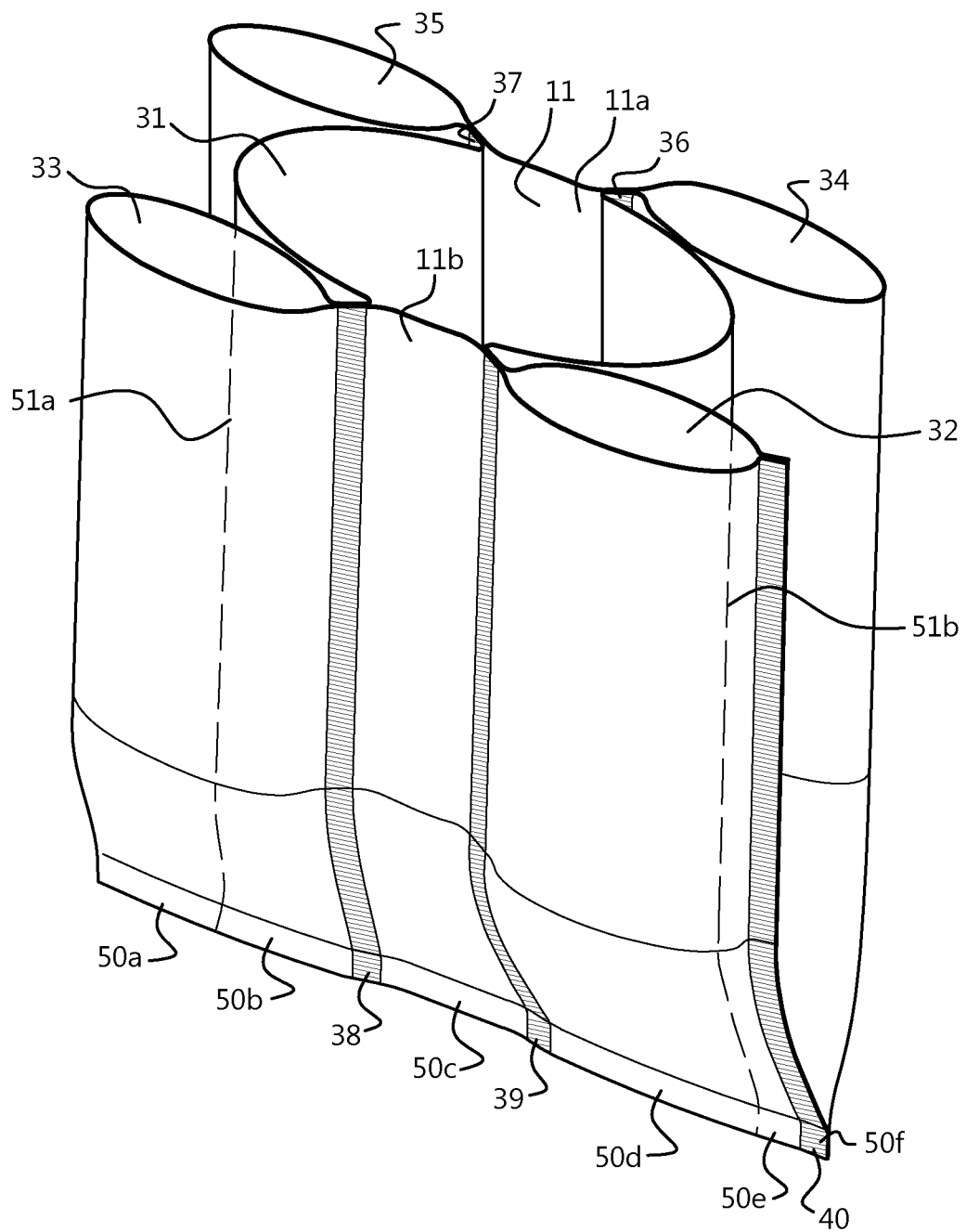
FIG. 3a shows the five-compartment bag of FIG. 3 after a transverse seal has been formed.

FIG. 3a shows the bag of FIG. 3 after transverse seal 50 has been formed. Dotted lines 51a and 51b show the outline of primary compartment 31, which is partially hidden behind secondary compartments 32 and 33.

In an embodiment transverse seal 50 is formed in one sealing action. In transverse seal area 50b the bottom seals of secondary compartments 33 and 35 overlap with the bottom seal of primary compartment 31. In transverse seal area 50d the bottom seals of secondary compartments 32 and 34 overlap with the bottom seal of primary compartment 31.

Bag forming material 11 has a first surface 11a forming the inner surface of primary compartment 31, and second surface 11b forming the outer surface of primary compartment 31. For standard, single compartment bags it is sufficient that bag forming material 11 is sealable at first surface 11a. In many cases second surface 11b is not sealable, for example as a result of a surface treatment and/or printing. For use in the method of the present invention it is necessary that bag forming material 11 is sealable at both surfaces 11a and 11b. This requirement applies to all multi-compartment bags of the present invention 5 and is not limited to the 5-compartment embodiment of FIG. 3b.

Transverse seal 50 comprises four plies of bag forming material 11 in transverse seal areas 50, 50e and 50f; six plies of bag forming material 11 in transverse seal areas 50b and 50d; and two plies of bag forming material 11 in transverse seal area 50c. Sheet material 11 is preferably selected for a suitable melting behavior to enable heat sealing of transverse seal 50 in a single step and obtain robust seals in all transverse seal areas 50a through 50f, regardless of the number of plies in each of these areas.

FIG. 4 shows a finished bag 47 comprising a first compartment 44 and a secondary compartment 46. The first compartment 44 contains potatoes 43; secondary compartment 46 contains spice bags 45.

Bag 47 has a first longitudinal seal 15 and a second longitudinal seal 18. It will be understood that bag 47 as shown in FIG. 4 has been turned 90° relative to its position during forming.

Bag 47 also has a first transverse seal 41 and a second transverse seal 42. Both transverse seals have a first portion (41a, 42a) and a second portion (41b, 42b). First portions 41a and 42a each contains two plies of the bag forming material. Second portions 41b and 42b each contains four plies of bag forming material. Transverse seal portions 41b and 42b keep secondary compartment 46 folded against first compartment 44, in a fixed position.

The area defined by corners 48a, 48b, 48c and 48d is the display area of bag 47. The display area is the same as of a corresponding bag lacking secondary compartment 46, that is, the presence of secondary compartment 46 does not change the display area of bag 47. This is important for retail stores, where display area is often limited and/or subject to standardization requirements.

The area of first compartment 44 defined by corners 48a, 49a, 49b and 48d is unobscured by secondary compartment 46, so that this area is available for printing consumer relevant information, such as a description of the contents of the bag, a brand name and logo, and the like.

Thus, the invention has been described by reference to certain embodiments discussed above. It will be recognized that these embodiments are susceptible to various modifications and alternative forms well known to those of skill in the art. For example, the volume of the second compartment may be modified by changing the diameter of second fill pipe 17. The width of sheet 11 can be varied accordingly.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method for forming a multi-compartment bag comprising the steps of:
   a. draping a portion of a continuous sheet of bag forming material around a primary fill pipe so that two plies of the sheet meet inward of a first longitudinal edge and of a second longitudinal edge along a first seal line, leaving flaps extending beyond the first seal line to the first longitudinal edge and second longitudinal edge of the sheet;
b. draping the flaps around at least one secondary fill pipe so that the first and second longitudinal edges of the sheet meet at a second seal line;
c. forming longitudinal seals along the first and second seal lines;
d. forming a transverse seal comprising transverse seal areas below the primary and secondary fill pipes to form a bag having a first compartment encircling the first fill pipe and at least one secondary compartment encircling the secondary fill pipe or fill pipes, so that a transverse seal area of the at least one secondary compartment at least partially overlaps with a transverse seal area of the first compartment whereby, as a result of the overlapping transverse seal, the secondary compartment is folded to a position against the first compartment and is fixed in this position;
e. metering a primary material into the first compartment and one or more secondary materials into the secondary compartment or compartments.

2. The method of claim 1 wherein the longitudinal and transverse seals are formed so that the secondary compartment is closed off from the first compartment.

3. The method of claim 2 wherein the multi-compartment bag comprises a first compartment and 2 to 4 secondary compartments.

4. The method of claim 3 wherein the secondary compartments are closed off from the first compartment and from each other.

5. The method of claim 1 comprising additional steps of:
f. moving the bag down by a longitudinal dimension of the bag and
g. repeating steps c. through e.

6. The method of claim 1 wherein the multi-compartment bag is a two-compartment bag.

7. The method of claim 1 wherein the transverse seal areas of the secondary compartment or compartments fully overlap with a transverse seal area of the primary compartment.

8. The method of claim 1 wherein the bag forming material has a first surface and a second surface, and both the first surface and the second surface are sealable.

9. The method of claim 1 wherein steps c. and d. are carried out simultaneously.

10. The method of claim 1 wherein the secondary fill pipe or pipes have a cross section of 10% to 75% of the cross section of the primary fill pipe.

* * * * *